United States Patent [19]

Stan

[11] 4,158,441
[45] Jun. 19, 1979

[54] AUTOMATIC IRRIGATION SYSTEM FOR CONTROL VALVE ASSEMBLY

[76] Inventor: William Stan, 20 Blair St., Cloverdale, Calif. 95425

[21] Appl. No.: 751,043

[22] Filed: Dec. 14, 1976

Related U.S. Application Data

[63] Continuation-in-part of Ser. No. 714,367, Aug. 16, 1976, abandoned.

[51] Int. Cl.² .......................................... A01G 27/00
[52] U.S. Cl. ...................................... 239/68; 239/70
[58] Field of Search ............................... 239/67–70, 239/66; 251/41, 45, 46; 137/624.14

[56] References Cited

U.S. PATENT DOCUMENTS

| | | | |
|---|---|---|---|
| 1,921,698 | 8/1933 | Price | 137/624.14 |
| 2,965,117 | 12/1960 | Gallacher | 137/624.14 X |
| 3,045,699 | 7/1962 | Childers | 239/65 X |
| 3,667,502 | 6/1972 | Otto | 137/624.14 |
| 3,964,685 | 6/1976 | Chauvigne | 239/70 X |

FOREIGN PATENT DOCUMENTS

2321102  11/1974  Fed. Rep. of Germany .............. 239/66
676095  2/1930  France ...................................... 239/70

Primary Examiner—John J. Love
Attorney, Agent, or Firm—Larson, Taylor and Hinds

[57] ABSTRACT

In one embodiment the main water valve to an irrigation system is connected by a fulcrum arm to a float chamber with a float therein operatively connected to the arm. When the water is "on" a controlled feed gradually fills the float chamber which shuts off the water when the float chamber is full. At this point a controlled bleed valve in the bottom of the float chamber gradually empties the float chamber and turns on the water when the float chamber is emptied thus timing the "on" cycle and the "off" cycle. By closing the controlled feed and fully opening the bleed valve, the water level in the ground can raise and lower the float so that irrigation is by soil moisture content rather than by time. In another embodiment the water in the float chamber raises and lowers air pressure in a sensing tube which acts upon a diaphragm which in turn is operatively connected to the fulcrum arm. Once again the actuation can be on a time basis or by the moisture content of the soil.

6 Claims, 8 Drawing Figures

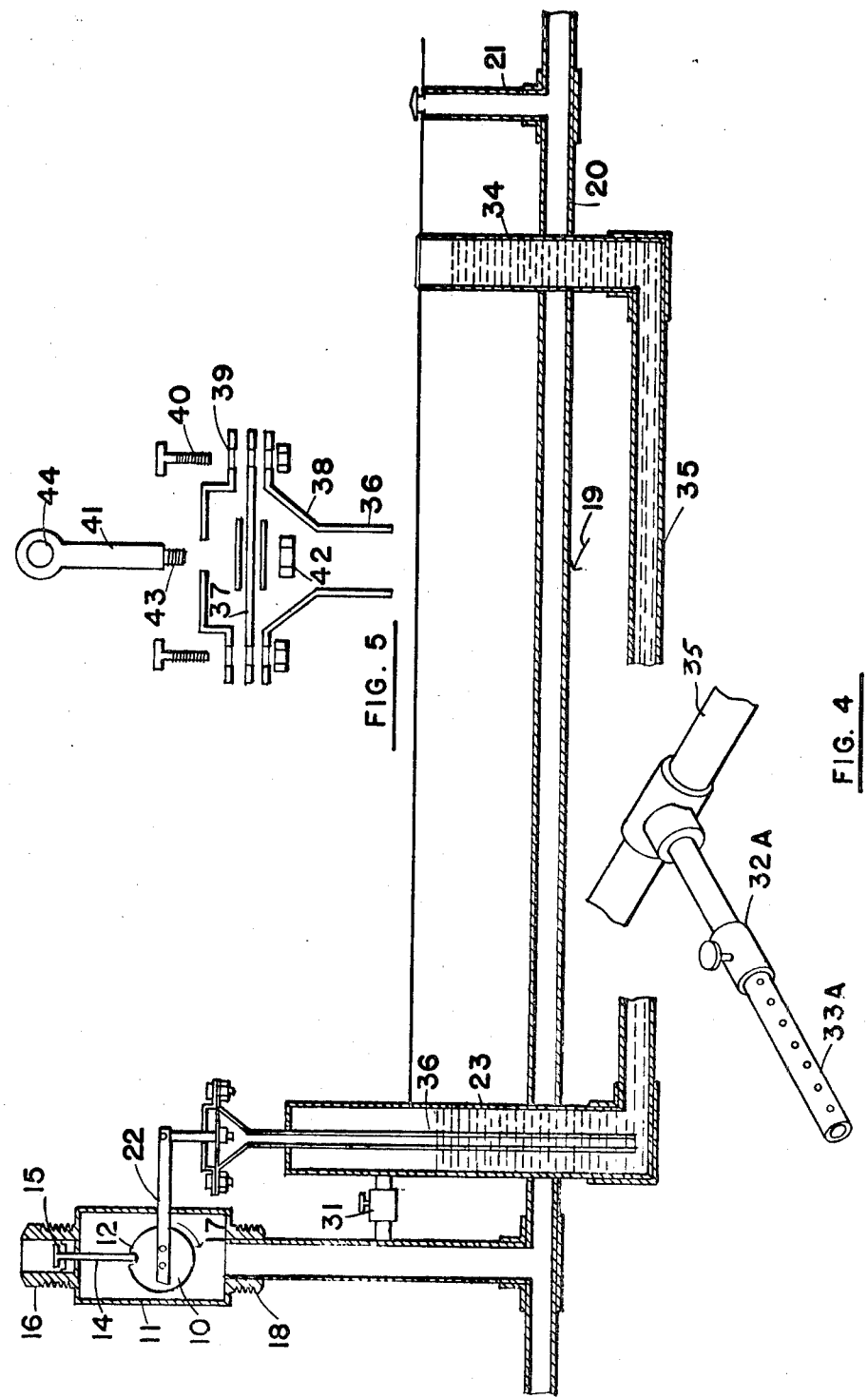

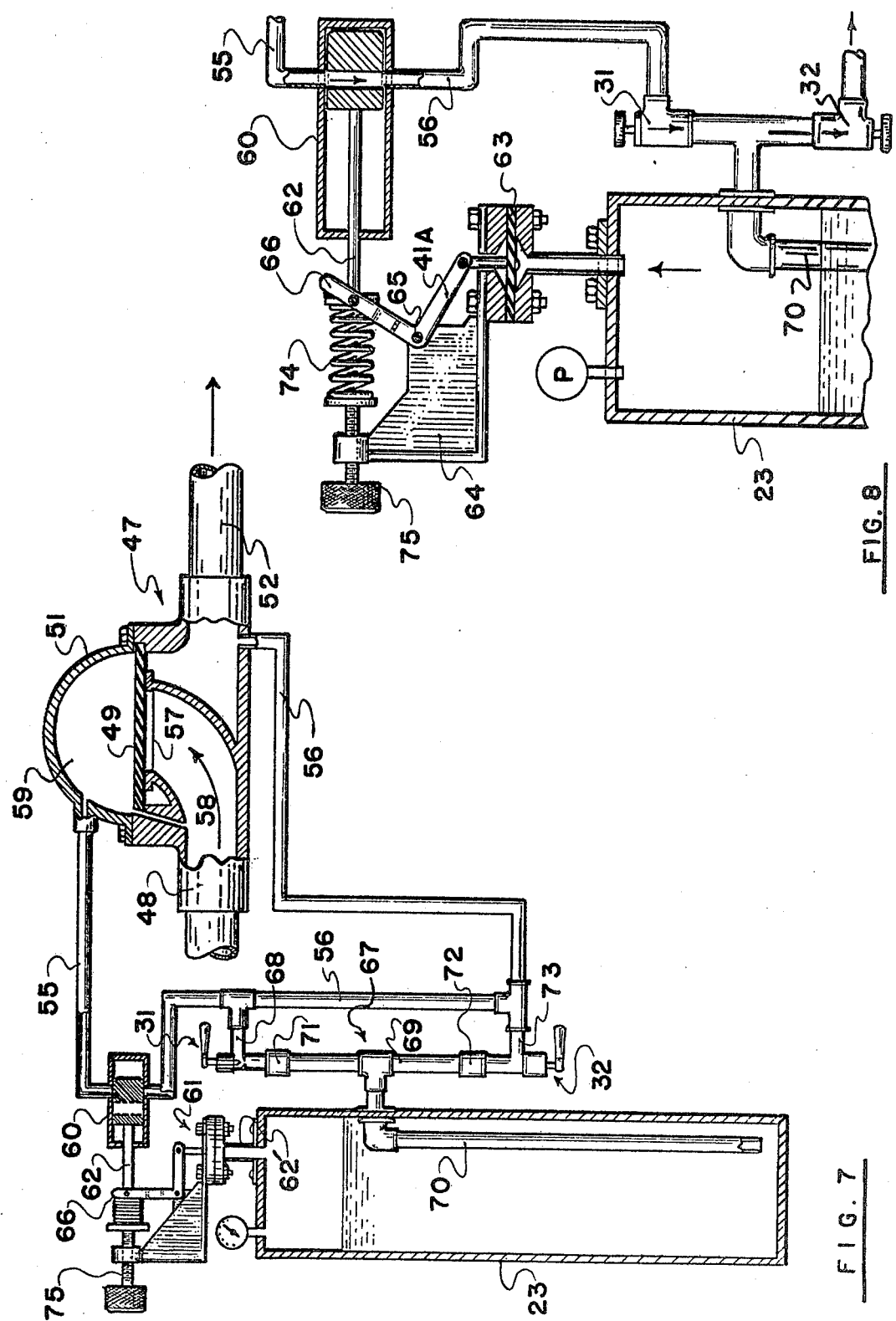

AUTOMATIC IRRIGATION SYSTEM FOR CONTROL VALVE ASSEMBLY

BACKGROUND OF THE INVENTION

This is a Continuation-In-Part application of Ser. No. 714,367 filed on Aug. 16th, 1976 now abandoned.

Automatic sprinkler systems normally operate on a clock timer which switches the system on and off at predetermined intervals.

Other systems are actuated by the moisture content of the ground but in all cases, a source of electricity is required in order to actuate various components including the clock and the valve.

This is inconvenient apart from adding to the cost of such systems.

SUMMARY OF THE INVENTION

The present invention overcomes these disadvantages by providing a fully automatic control system which can be actuated on a time basis or on a moisture content basis depending upon the choice of the user.

The principal object and essence of the invention is therefore to provide a device of the character herewithin described in one embodiment, in which a control chamber gradually fills with water when the sprinkler system is on thus shutting off the sprinkler system and then gradually drains until it is empty thus switching on the sprinkler system, both actions being by mechanical linkage and the preferred embodiment utilizes pressure within the control chamber to actuate the device.

Another object of the invention is to provide a device of the character herewithin described in which the source of water for the control chamber is from the water supplying the sprinkler system.

Yet another object of the invention is to provide a device of the character herewithin described in which the source of water is from the ground itself so that the sprinkler system is switched on and off on demand or moisture content basis rather than on a time basis.

Yet another object of the invention is to provide a device of the character herewithin described which can either be actuated by a float within the control chamber or by combination of water and air pressure acting upon a diaphragm.

A still further object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 4 is a partially sectioned isometric view of an alternative embodiment of the invention.

FIG. 5 is an enlarged cross sectional view of the diaphragm assembly of FIG. 4.

FIG. 7 is a schematic, partially sectioned view of the preferred embodiment with the pressure switch in the closed position.

FIG. 8 is a fragmentary view of the pressure switch in the open position.

In the drawings like characters of reference indicate corresponding parts in the different figures.

DETAILED DESCRIPTION

Figure 1:
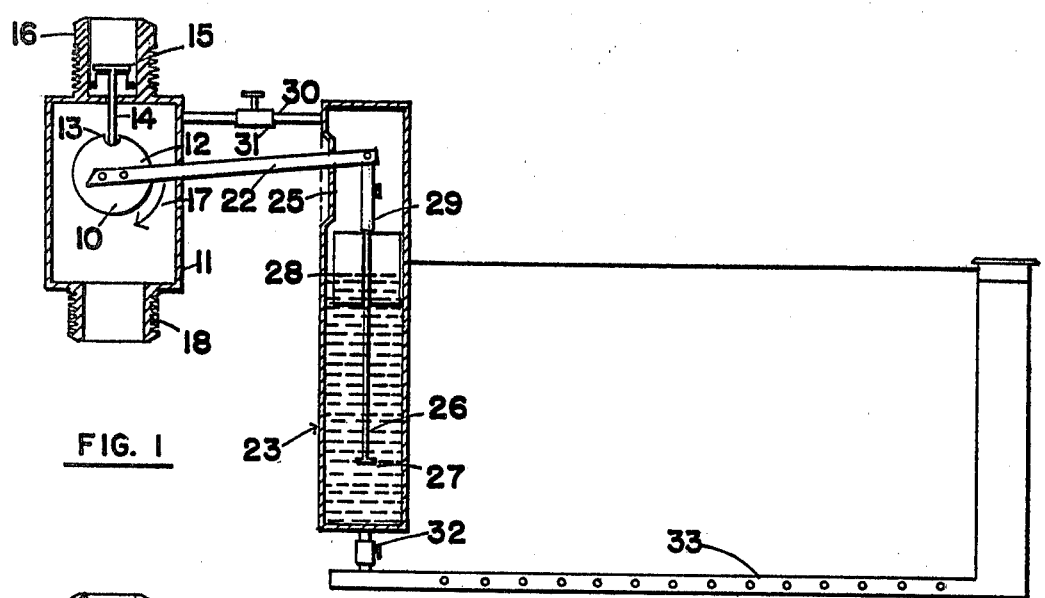
FIG. 1 is a partially schematic cross sectional view of one embodiment of the invention showing the float in the uppermost position.

Proceeding therefore to describe the invention in detail, reference character 10 illustrates a control valve which may take many conventional forms. It is situated within a chamber or conduit 11 and in this embodiment, includes a disc 12 having a notch 13 in the periphery thereof into which a valve control plunger 14 engages when the valve assembly 15 is in the "off" position. This valve assembly 15 is within the inlet water connection 16 and is conventional.

When the valve disc 12 is moved in the direction of arrow 17, the rod 14 is moved upwardly thus opening the valve 15 and allowing water into the conduit 11 and thence through the outlet 18 to a conventional water sprinkler system 19 which includes main conduit 20 and a plurality of sprinkler heads 21.

The disc is controlled by a fulcrum lever 22 connected thereto and extending outwardly therefrom as clearly shown in the drawings.

A control chamber collectively designated 23 is provided and is partially sunk within the ground, ground level being indicated by reference character 24.

Figure 2:
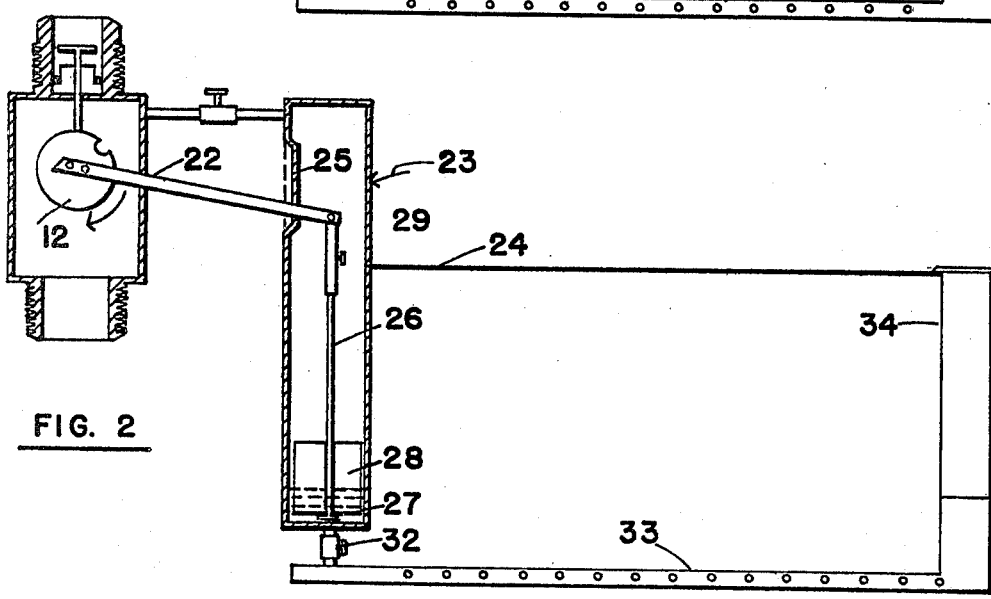
FIG. 2 is a view similar to FIG. 1 but showing the float in the lowermost position.

The fulcrum lever 22 extends into the control chamber through a slot 25 in the wall thereof and, in the embodiment shown in FIGS. 1 and 2, a control rod 26 is pivotally connected to the upper end of the fulcrum lever 22. A stop 27 is provided at the lower end of the control rod 26 and a float 28 engages freely around the rod 26 and raises and lowers relative to the rod as will hereinafter be described. An adjustable sleeve 29 engages around rod 26 at the upper end thereof and by adjusting the position of this lever on the rod, the "off" position of the valve is controlled.

Means are provided to empty and fill the control chamber and in the embodiment shown in FIGS. 1 and 2, a conduit 30 extends between the chamber 11 and the control chamber 23 with an adjustable float chamber filler valve 31 being provided therein. The degree of opening this valve controls the feed of water to the control chamber 23 thus controlling the time it takes for the float 28 to move from the lowermost position of the control rod 26 to the uppermost position shown in FIG. 1 at which time of course the valve 15 will be shut off by the action of the fulcrum lever taised by the float engaging the sleeve 29.

When the main water supply is hut off, no further water flows through conduit 30 but the control chamber 23 gradually empties through an adjustable lower bleed valve 32 situated in the bottom of the chamber and preferably connected to a perforated drain tube 33 which is situated underground.

As the control chamber 23 empties, the float gradually moves downwardly until it strikes the stop 27 which will actuate the fulcrum lever 22 and displace the rod 14 from the notch 13 within the disc 12 thus turning on the water and starting the sprinkler system. At the same time of course the valve 31 begins to fill the chamber and the float commences to rise.

Figure 3:
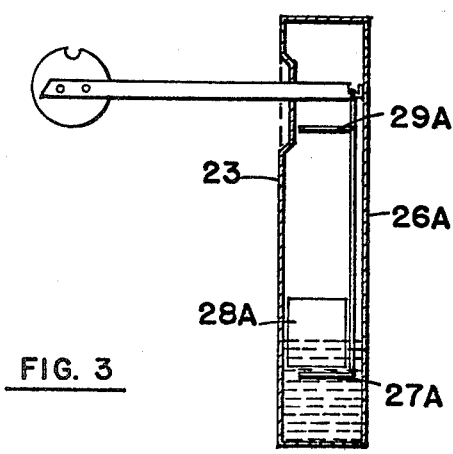
FIG. 3 is a schematic cross sectional view showing an alternative arrangement of the float within the control chamber.

FIG. 3 shows an alternative construction of the float 28A and the control rod 26A. In this embodiment, the float is free within the chamber 23 and strikes an upper adjustable stop 29A when in the uppermost position and a lower stop 27A when in the lowermost position.

If it is desired to operate this embodiment by the moisture content rather than by the timing of the filling and emptying of the control chamber 23, the float chamber filler valve 31 is closed and the bleed valve 32 is opened fully. Standpipe 34 is situated within the ground remote from the control chamber 23 and within the area of ground being watered by the sprinkler system. It is open at the upper end which is substantially flush with ground level 24 and is connected by a conduit 35 to the lower end of the control chamber 23. In the embodiment shown in FIG. 2, the conduit is connected to the outlet of the bleed valve 32 but a slightly different arrangement is shown in FIG. 4 as will hereinafter be described.

The standpipe collects moisture and water from the sprinkler system which passes through the conduit 35 and, by a U tube effect, gradually fills the control chamber until the float reaches the uppermost position which then switches off the water supply to the sprinkler system. A further adjustable bleed valve 32A is connected to the conduit 35 and a perforated drain tube 33A is connected to the bleed valve so that once the water is off, the control chamber 23 gradually drains through the bleed valve and through the drain pipe 33A until the float reaches the lowermost position which of course switches on the sprinkler system once again.

The advantage of this particular embodiment is that it is based on a moisture content basis rather than on a time basis.

FIGS. 4 and 5 show a further embodiment which, instead of utilizing a float 28 within the control chamber 23, utilizes a pressure sensing line or conduit 36. This extends downwardly into the control chamber 23 adjacent the base thereof so that water within the control chamber varies the pressure of air within the pressure sensing line or conduit 36.

A diaphragm 37 spans the flared upper end 38 of the line 36 and is clamped in position by means of a cover 39 held by means of bolts 40.

An actuating link 41 is secured to the center of the diaphragm by means of nut 42 engaging the screw threaded end 43 thereof in sealing relationship and the upper end of this actuating link is in the form of an eye 44 by which it is pivotally connected to aforementioned fulcrum arm 22 and actuates the main water valve in a manner hereinbefore described.

The control chamber filler valve 31 operates in a manner similar to that hereinbefore described and if on a time basis, then the lower bleed valve 32 may be connected directly to the base of the control chamber 23 with a drain tube 33 as hereinbefore described.

However, if this particular embodiment is actuated on a demand or moisture basis, then valve 31 is closed and the arrangement shown in FIG. 4 is utilized with the standpipe 34 being connected to the base of the control chamber 23 by means of the conduit 35.

Under these circumstances, the bleed valve 32A and the drain tube 33A may be incorporated to control the speed at which the control chamber empties.

Both embodiments enable the operator to set the device to operate on a time basis depending upon the time taken to fill and empty the control chamber 23 or on a demand basis under which circumstances the control is by the amount of water within the ground from the sprinkler system and/or any precipitation that might occur.

Figure 6:
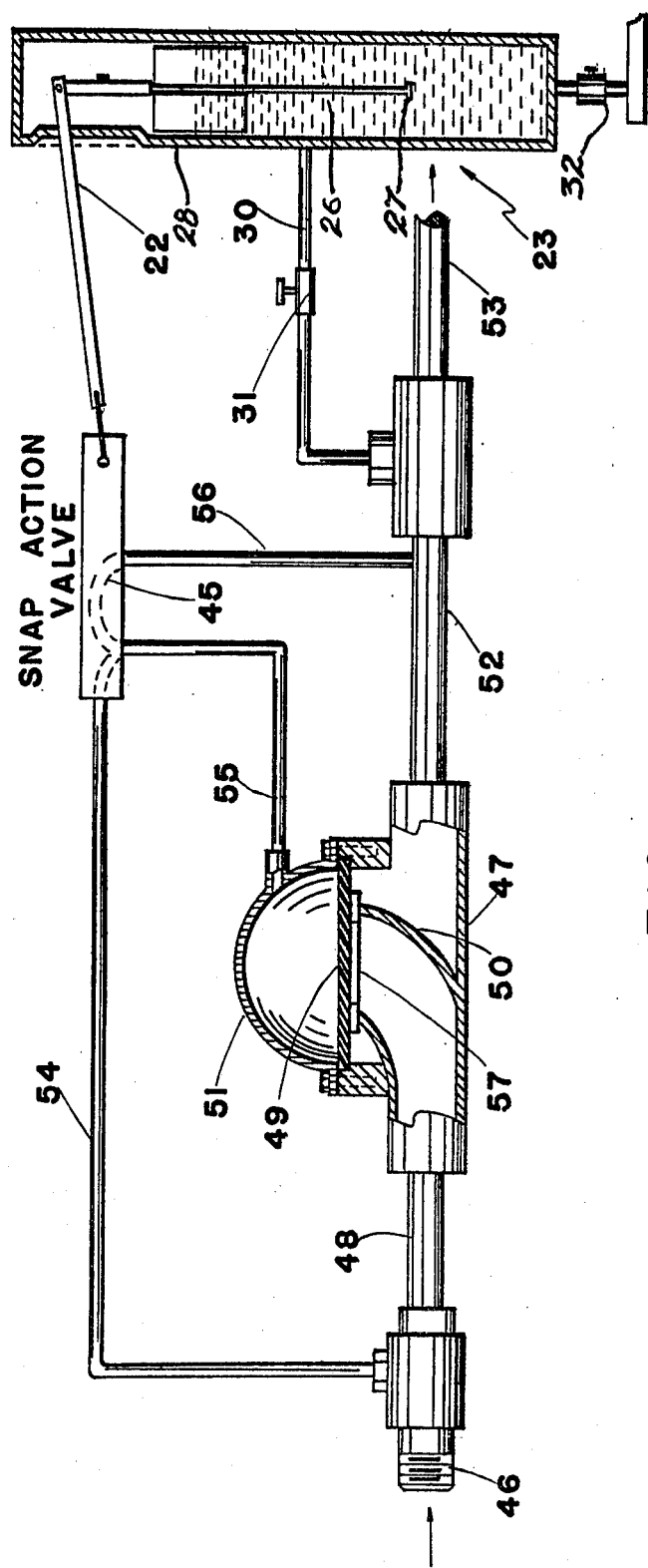
FIG. 6 is a fragmentary partially sectioned view showing an automated system.

FIG. 6 shows an alternative to FIGS. 1 and 2 in which the float 28 operates within the float tube 23 as hereinbefore described.

However, in this embodiment, the fulcrum lever 22 operates a three-way snap action valve 45 which is of conventional construction.

The water intake 46 is connected to a diaphragm chamber 47 by means of conduit 48 and water enters 46 and communicates with the underside of a flexible diaphragm 49, by means of portion 50.

The diaphragm 49 is clamped within the chamber 47 and is covered by cover 51 in the usual manner and conduit 52 connects chamber 47 to the water outlet 53 which in turn is connected to the sprinkler system as hereinbefore described.

A conduit 54 extends between the water inlet 46 and the valve 45 and a further conduit 55 extends between valve 45 and the chamber 47 above diaphragm 49. A further conduit 56 extends between valve 45 and the outlet connecting conduit 52.

When the float 28 is in the uppermost position illustrated in FIG. 1, the fulcrum lever 22 is moved upwardly and the snap action valve connects conduits 54 and 55. This balances the water pressure above and below diaphragm 49 which therefore remains closed and no water flows.

When the float 28 is in the lowermost position as illustrated in FIG. 2, the fulcrum lever 22 actuates valve 45 and disconnects conduits 54 and 59 and connects conduits 55 and 56 which allows the pressure above the diaphragm to bleed off through the sprinkler system.

This allows the water under pressure entering at 46, to raise the diaphragm from the valve seat or diaphragm seat 57 and allow the flow of water through conduits 55 and 56 to the outlet and also past the diaphragm to conduit 52.

The preferred embodiment which is shown in FIGS. 7 and 8 is somewhat similar to FIG. 6 so that, where applicable, similar reference characters have been used.

In this embodiment, a combination of water and air pressure controls is the operation of the main control valve 47 which, is an hydraulically operated control valve similar to that illustrated in FIG. 6. In other words, water under pressure enters at 48 and lifts the diaphragm 49 from the upper end of the conduit 57 thus allowing water to pass to the outlet 52.

A bleed passageway 58 extends between the inlet conduit 48 and the upper chamber 59 situated above the diaphragm 49. Under normal circumstances, because of the larger diameter of the diaphragm 49 in the upper chamber, the water pressure in the upper chamber will keep the diaphragm closed thus preventing water from passing to the outlet 52 which is attached to the irrigation sprinkler system as hereinbefore described.

The snap action valve illustrated in FIG. 6 is replaced by a spring loaded normally closed two-way bleed valve 60 and conduit 55 extend between this valve 60 and the upper chamber 59 in a similar manner to that hereinbefore described with reference to FIG. 6.

Similarly, conduit 56 extends between the valve 60 and the outlet conduit 52.

The control chamber 23, in this embodiment, is a sealed chamber and a pressure switch collectively designated 61 is connected to the upperside of this chamber and to the plunger 62 of the normally closed valve 60.

Pressure switch 61, in this embodiment, comprises a short circuit 62' sealably secured to the upper end of the chamber 23 and communicates with a diaphragm 63 in a construction similar to that illustrated and described in FIG. 5.

However, the rod or element 41A is in the form of a bell crank pivoted to a support 64 by means of pivot 65 and the distal end 66 of this bell crank engages the plunger 62 of the valve 60.

Normally, pressure within the chamber 23 maintains the bell crank in the position illustrated in FIG. 7 under which circumstances the valve 60 is closed so that water pressure in the upper chamber 59, maintains the diaphragm 49 closed, on the intake 57 so that water does not flow through the outlet 52.

Means collectively designated 67 are provided to control the time that this hydraulic valve remains closed and also to control the time that it remains open.

In this embodiment, a small conduit 68 extends from conduit 56 and connects to a conduit 69 which in turn connect to the combination inlet and outlet tube 70 within the chamber 23. The lower open end of this conduit 70 terminates adjacent the base of the chamber 23.

An upper one-way valve 71 is provided within the conduit 69 and a lower one-way valve 72 is also provided within this conduit with the connection to conduit 70 being between these one-way valves as clearly illustrated.

An adjustable bleed valve 31 controls the flow of water from conduit 56 through the one-way check valve 71 and into the chamber 23 and a similar adjustable bleed valve 32 is situated downstream of the check valve 72 and controls the communication of flow of water from conduit 69 to conduit 56, it being observed that a relatively short conduit 73 connects to conduit 56.

When the chamber 23 is pressurized, as will hereinafter be described, the pressure switch 61 is in the position shown in FIG. 7 with valve 60 closed and it will be noted that the crank arm 41A, is in the position shown against the pressure of a small spring 74 extending between the distal end 66 and an adjustable screw assembly 75 engages through an extension 76 of the support 64. By rotating the adjustable screw 75, the pressure of spring 74 is controlled.

When the pressure within the chamber 23 drops, as will hereinafter be described, the strength of the compression spring 74 overcomes the pressure within the chamber and allows the crank arm to move to the position shown in FIG. 8 which moves the plunger 62 and hence opens the valve 60 thus allowing a communication between lines or conduits 55 and 56.

In operation, and assuming that the main control valve is closed and also valve 60 is closed, the level of water within chamber 23 pressurizes the air cushion thereabove and applies pressure to switch 61 thus maintaining the switch 60 in the closed position.

However, this air cushion pressure is slowly discharging water through conduit 70, into conduit 69, through the one-way valve 72 and out into conduit 56, the degree being controlled by the adjustable bleed valve 32.

When sufficient pressure has been bled off from valve 23, spring 74 overcomes this pressure and moves the plunger 62 as hereinbefore described thus opening valve 60 and permitting connection between conduits 55 and 56.

This bleeds off water from the upper chamber 59 of the main hydraulic valve 47 through line 55, through valve 60 and then through valve 56 thus permitting the water within the intake 48 to lift the diaphragm 49 thus opening the connection through the outlet 52.

At the same time, water continues to flow into the upper chamber 59 through the bleed hole or drilling 58 and thence through conduit 55, valve 60 to conduit 56 whereupon it passes through conduit 68, through the one-way check valve 71 and into the conduit 70 within chamber 23, the bleed rate being controlled by the adjustable valve 31. This gradually builds up pressure in the air cushion above the water level until it overcomes the strength of the spring 74 and allows the valve to close whereupon pressure will gradually build up in the upper chamber 59 until the diaphragm 49 closes.

In other words, the bleed valves 31 and 32 control the rates of water flow into and out of the chamber 23 and hence the time that the diaphragm 49 is opened and the time that the diaphragm is closed. In other words, these valves 31 and 32 control the time that the sprinkler or irrigation system is "on" and the time that the system is "off".

Finally, it should be noted that the pressure in line 56 is always higher than in chamber 23 even when water is flowing in line 52. The degree of pressure in chamber 23 is preset to close valve 60 by the adjustment 75, at a lower pressure than the operating pressure in the system, which of course will be the pressure in line 56 when valve 60 is open. This is the reason for one-way check valve 72 with check valve 71 to prevent bleeding through valve 31 when valve 60 is closed.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. In an irrigation system which includes a source of water under pressure, a sprinkler system and a main valve assembly operatively connecting and disconnecting said source of water to said sprinkler system, said main valve assembly including a connecting conduit between said source of water and said sprinkler system; the improvement comprising means to control the main valve assembly between a water "on" position and a water "off" position and vice versa, said means including a water level control chamber, and means operated by the level of water in said control chamber whereby when said water level is at the maximum, said main valve assembly is in the "off" position and when said water level is at the minimum, said valve is in the "on" position and means to fill and empty said control chamber, said main valve assembly comprising an hydraulic valve, said valve including an upper chamber, a diaphragm spanning said chamber and a lower chamber below said diaphragm, water inlet and outlet means connected to said lower chamber, said diaphragm controlling the operative connection between said water inlet and outlet means, a bleed connection between said valve chambers, a two-way valve operatively connected between said upper chamber and said water outlet, pressure operated means extending between said control chamber and said two-way valve to actuate same and adjustable means operatively connected between said two-way valve and said control chamber to control the time filling and emptying of said control chamber and hence the time between actuation of said two-way valve and the actuation of said main control valve.

2. The invention according to claim 1 in which said adjustable means operatively connect between said two-way valve and said control chamber comprises a conduit operatively connected between said two-way valve and said control chamber, said conduit including an inlet and an outlet end, a first one-way valve in said conduit, adjacent said inlet end, and an adjustable inlet bleed valve in said conduit between said first one-way and said two-way valve, the adjustment of said bleed valve controlling the entry of water and hence the pressure within said control chamber, a second one-way valve in said conduit adjacent the outlet end thereof, an adjustable outlet bleed valve downstream of said second one-way valve, the adjustment of said outlet bleed valve controlling the out-flow of water and hence the pressure within said control chamber.

3. The invention according to claim 1 in which said pressure operated means includes an adjustable pressure switch operatively connected to said control chamber and to said two-way valve, operated by pressure within said control chamber, and normally maintaining said two-way valve in the closed position, the release of pressure from said chamber opening said two-way valve and operatively connecting said upper chamber to said control chamber.

4. The invention according to claim 2 in which said pressure operated means includes an adjustable pressure switch operatively connected to said control chamber and to said two-way valve, operated by pressure within said control chamber, and normally maintaining said two-way valve in the closed position, the release of pressure from said chamber opening said two-way valve and operatively connecting said upper chamber to said control chamber.

5. An assembly for irrigation systems for use with a source of water under pressure comprising in combination a main control valve connected between the source of water and the irrigation system and means to operate said control valve from an open position to a closed position and vice-versa, said means including adjustable pressure operated means controlling the time said main valve is open and the time said main valve is closed, said main valve comprising an hydraulic valve including an upper chamber and a lower chamber and a diaphragm therebetween, said lower chamber being operatively connected to said source of water under pressure and to the irrigation system, said diaphragm controlling the connection between said source of water and said irrigation system, and bleed means between said source of water and said upper chamber, a water level control chamber, a two-way valve operatively connected between said upper chamber and said irrigation system, said pressure operated means being operatively connected between said two-way valve and said control chamber to control the time of filling and emptying of said control chamber and hence the time between actuation of said two-way valve and the actuation of said main control valve, said adjustable means operatively connect between said two-way valve and said control chamber comprising a conduit operatively connected between said two-way valve and said control chamber, said conduit including an inlet and an outlet end, a first one-way valve in said conduit, adjacent said inlet end, and an adjustable inlet bleed valve in said conduit between said first one-way and said two-way valve, the adjustment of said bleed valve controlling the entry of water and hence the pressure within said control chamber, a second one-way valve in said conduit adjacent the outlet end thereof, an adjustable outlet bleed valve downstream of said second one-way valve, the adjustment of said outlet bleed valve controlling the outflow of water and hence the pressure within said control chamber.

6. The invention according to claim 5 in which said pressure operated means includes an adjustable pressure switch operatively connected to said control chamber and to said two-way valve, operated by pressure within said control chamber, and normally maintaining said two-way valve in the closed position, the release of pressure from said chamber opening said two-way valve and operatively connecting said upper chamber to said control chamber.

* * * * *